United States Patent
Kusunoki

(10) Patent No.: US 8,614,841 B2
(45) Date of Patent: Dec. 24, 2013

(54) IMAGE-READER

(75) Inventor: Hideyuki Kusunoki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 278 days.

(21) Appl. No.: 13/074,147

(22) Filed: Mar. 29, 2011

(65) Prior Publication Data

US 2011/0267662 A1 Nov. 3, 2011

(30) Foreign Application Priority Data

Apr. 30, 2010 (JP) ................................ 2010-105781

(51) Int. Cl.
| | | |
|---|---|---|
| H04N 1/04 | (2006.01) | |
| H04N 1/46 | (2006.01) | |
| H04N 1/21 | (2006.01) | |
| H04N 1/40 | (2006.01) | |
| H04N 7/12 | (2006.01) | |
| G06F 15/00 | (2006.01) | |
| H03M 7/46 | (2006.01) | |
| B41J 2/435 | (2006.01) | |
| B41J 27/00 | (2006.01) | |

(52) U.S. Cl.
USPC ........... 358/483; 358/474; 358/509; 358/475; 358/498; 358/296; 358/448; 358/1.9; 341/63; 347/248; 347/258; 347/261; 348/426.1

(58) Field of Classification Search
USPC ................. 358/483, 509, 474, 475, 498, 296; 341/63; 347/248
See application file for complete search history.

(56) References Cited

U.S. PATENT DOCUMENTS

| | | | |
|---|---|---|---|
| 5,668,547 A * | 9/1997 | Lee ................................. | 341/63 |
| 5,724,152 A | 3/1998 | Hayashi et al. | |
| 7,453,607 B2 | 11/2008 | Hiromatsu | |
| 2002/0039207 A1* | 4/2002 | Kanda ........................... | 358/498 |
| 2003/0067533 A1* | 4/2003 | Omori et al. .................. | 347/248 |
| 2003/0197900 A1 | 10/2003 | Hiromatsu | |
| 2006/0044620 A1* | 3/2006 | Namikawa .................... | 358/296 |
| 2011/0170152 A1* | 7/2011 | Nihei ............................ | 358/509 |

FOREIGN PATENT DOCUMENTS

| | | |
|---|---|---|
| JP | H06-205159 | 7/1994 |
| JP | 2002-190925 | 7/2002 |
| JP | 2002-209069 | 7/2002 |

(Continued)

OTHER PUBLICATIONS

Office Action dated Feb. 21, 2012 received from the Japanese Patent Office from related Japanese Application No. 2010-105781, together with an English-language translation.

*Primary Examiner* — Charlotte M Baker
*Assistant Examiner* — Rury Grisham
(74) *Attorney, Agent, or Firm* — Scully, Scott, Murphy & Presser, PC

(57) ABSTRACT

In an image-reader, the first counter is configured to count a first count value based on a first clock. The second counter is configured to count a second count value based on a second clock. The first reading unit is configured to read a first surface of a document sheet based on the first count value. The second reading unit is configured to read a second surface of the document sheet based on the second count value. The second surface is opposite surface of the first surface. When the first count value reaches a prescribed first value, both the first counter value and the second count value are reset.

10 Claims, 7 Drawing Sheets

(56) References Cited

FOREIGN PATENT DOCUMENTS

| | | |
|---|---|---|
| JP | 2002-359721 | 12/2002 |
| JP | 2003-315929 | 11/2003 |
| JP | 2006-67441 | 3/2006 |
| JP | 2008-252320 | 10/2008 |
| JP | 2009-253458 | 10/2009 |

* cited by examiner

IMAGE-READER

CROSS REFERENCE TO RELATED APPLICATION

This application claims priority from Japanese Patent Application No. 2010-105781 filed Apr. 30, 2010. The entire content of the priority application is incorporated herein by reference.

TECHNICAL FIELD

The invention relates to an image-reader for reading images from an original.

BACKGROUND

A conventional image-reader known in the art is provided with a first image-reading unit and a second image-reading unit disposed on a path along which a document sheet is conveyed. The first image-reading unit is provided for one surface of the document sheet, and the second image-reading unit for the other surface of the document sheet, whereby the first and second image-reading unit can simultaneously read both surfaces of a document sheet conveyed along the conveying path.

Japanese Patent Application Publication No. 2002-359721 proposes an image-reader that has a first image-reading unit and a second image-reading unit and controls the first image-reading unit based on the cycle count of a clock signal inputted into the first image-reading unit and controls the second image-reading unit based on the cycle count of a clock signal inputted into the second image-reading unit. The proposed image-reader also attempts to decrease the difference in read times between the first and second image-reading units by comparing each of their clock cycle counts with predetermined reference values.

SUMMARY

However, while the image-reader disclosed in Japanese Patent Application Publication No. 2002-359721 can reduce the difference in reading times between the first and second image-reading units, this difference is accumulated while the original progresses along the conveying path. This accumulated difference can generate offset in the subscanning direction between the reading position on one surface read by the first image-reading unit and the reading position on the other surface read by the second image-reading unit.

Therefore, it is an object of the present invention to provide an image-reading device having a first image-reading unit for reading one surface of an original conveyed along a conveying path, and a second image-reading unit for reading the other surface of the original conveyed along the conveying path and being capable of suppressing offset in the subscanning direction between reading positions of the first and second image-reading units.

In order to attain the above and other objects, the invention provides an image-reader. The image-reader includes a first counter, a second counter, a first reading unit, and a second reading unit. The first counter is configured to count a first count value based on a first clock. The second counter is configured to count a second count value based on a second clock. The first reading unit is configured to read a first surface of a document sheet based on the first count value. The second reading unit is configured to read a second surface of the document sheet based on the second count value. The second surface is opposite surface of the first surface. When the first count value reaches a prescribed first value, both the first counter value and the second count value are reset.

BRIEF DESCRIPTION OF THE DRAWINGS

The particular features and advantages of the invention as well as other objects will become apparent from the following description taken in connection with the accompanying drawings, in which.

DETAILED DESCRIPTION

Overall Structure of an Image-Reader

Figure 1:
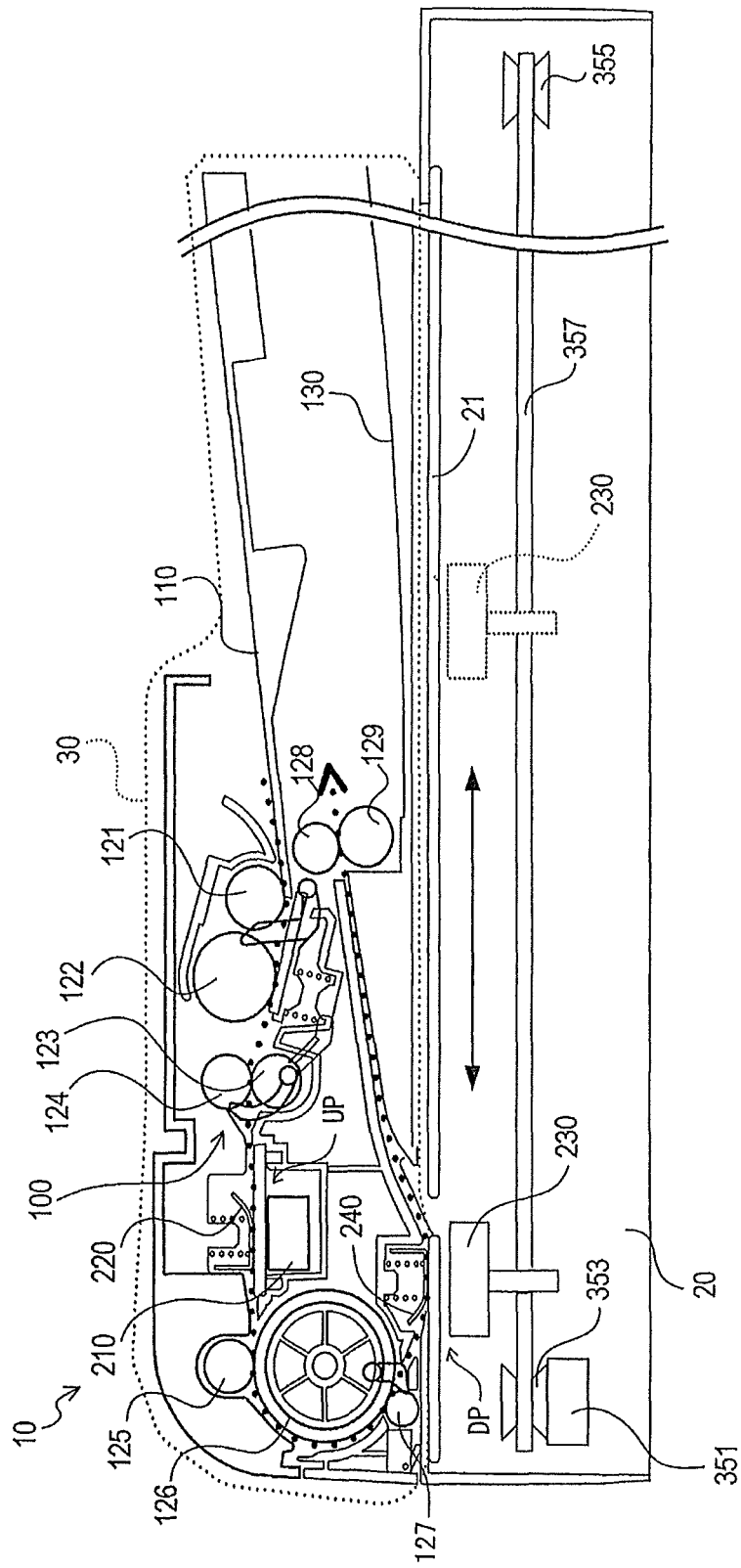
FIG. 1 is a cross-sectional view conceptually illustrating a structure of an image-reader according to an embodiment of an invention.

FIG. 1 is a cross-sectional view conceptually illustrating the structure of an image-reader 10 to which the invention is applied. The image-reader 10 is provided in the top of a main casing 20 of a multifunction device housing an image-forming unit (not shown). The image-reader 10 includes a document cover 30 provided on the top surface of the main casing 20 and capable of being opened and closed thereon.

As shown in FIG. 1, a transparent document support base 21 formed of glass is provided on the top surface of the main casing 20. The document support base 21 serves to support a document sheet (not shown) when the image-reader 10 is used as a flatbed scanner. After a document sheet is placed on the document support base 21, the document cover 30 can be closed over the surface of the document support base 21 so as to cover the document sheet.

The document cover 30 is also provided with a conveying unit 100 functioning as an automatic document feeder (ADF). Further, the document cover 30 includes a second image-reading unit 210. The conveying unit 100 conveys a document sheet set in a sheet-feeding tray 110 along a conveying path. The second image-reading unit 210 functions to read an image of the back surface of an original as the original is conveyed along the conveying path. A first image-reading unit 230 is disposed in the main casing 20. The first image-reading unit 230 functions to read an image of the front surface of an original conveyed along the conveying path in parallel with the second image-reading unit 210.

The conveying unit 100 includes conveying rollers 121-129 for conveying document sheets placed in the sheet-feeding tray 110 from the sheet-feeding tray 110 to a discharge tray 130 along a conveying path indicated by the dotted line in FIG. 1. An upstream reading position UP and a downstream reading position DP are established on the conveying path. The second image-reading unit 210 for reading images from the back surface of a document sheet is disposed at the upstream reading position UP. A back-surface document pressing piece 220 is provided for pressing the document sheet against the reading surface of the second image-reading unit 210 as the document sheet is conveyed through the upstream reading position UP. The first image-reading unit 230 for reading images from the front surface of a document sheet is adjustably disposed on the document support base 21 and can be moved to the downstream reading position DP. A front-surface document pressing piece 240 is provided for pressing a document sheet against the reading surface of the first image-reading unit 230 as the document sheet is conveyed through the downstream reading position.

Within the main casing 20, the image-reader 10 is provided with a drive pulley 353, a follow pulley 355, an endless belt 357 looped around the drive pulley 353 and follow pulley 355, and a motor 351 for driving the drive pulley 353 to rotate. The first image-reading unit 230 is fixed to the endless belt 357 and positioned on the underside of the document support base 21 and can be moved in a subscanning direction (left-to-right direction in FIG. 1) beneath the document support base 21 as the motor 351 drives the drive pulley 353 to rotate.

Structure of a Control System for the Image-Reading Units

Figure 2:
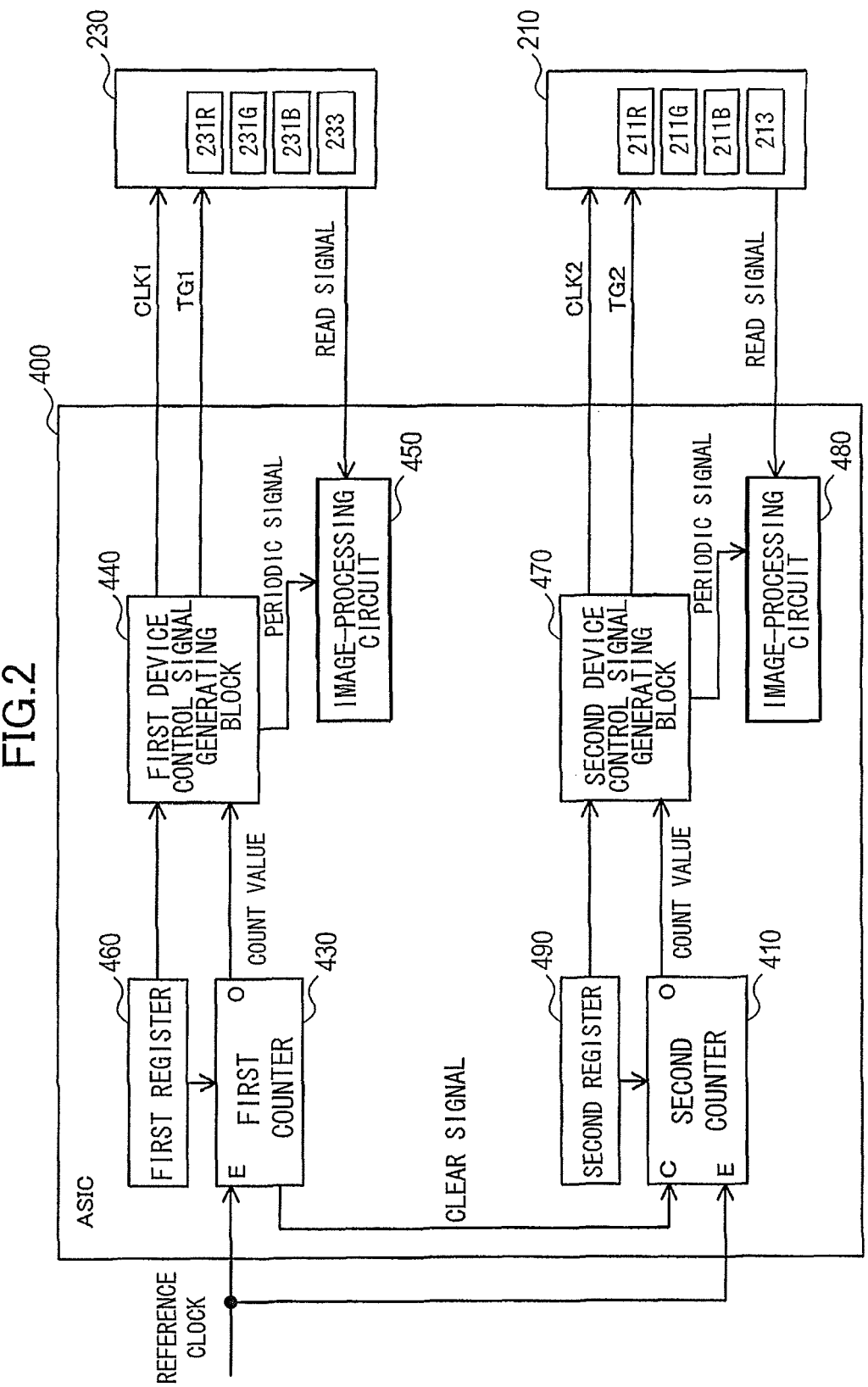
FIG. 2 is a block diagram illustrating a control system of the image-reader.

As shown in FIG. 2, the image-reader 10 has a control system configured primarily of an application-specific integrated circuit (ASIC) 400. The ASIC 400 is provided with a first counter 430 and a second counter 410 for counting cycles of a reference clock. The first counter 430 inputs a count value into a first device control signal generating block 440. Based on the inputted count value, the first device control signal generating block 440 inputs into the first image-reading unit 230 control signals including a clock signal CLK1 and a trigger signal TG1.

The first image-reading unit 230 includes light sources 231R, 231G, and 231B; and a light-receiving unit 233. The light sources 231R, 231G, and 231B respectively irradiates light in red (R), green (G), and blue (B) as a line extending along the main scanning direction of the document sheet. The light-receiving unit 233 has a plurality of light-receiving elements arrayed in the main scanning direction for detecting reflected light from the document sheet that originated from light irradiated by the light sources 231R, 231G, and 231B. In other words, the first image-reading unit 230 is a contact image sensor (CIS) device that sequentially activates the light sources 231R, 231G, and 231B, while switching among light sources at a timing based on the trigger signal TG1, and the light-receiving unit 233 sequentially outputs read signals corresponding to the amount of light received by the light-receiving elements.

Read signals outputted from the light-receiving unit 233 are inputted into an image-processing circuit 450 provided in the ASIC 400. The image-processing circuit 450 processes the inputted read signals one pixel at a time based on a periodic signal inputted from the first device control signal generating block 440 to convert the image scanned from the document sheet into two-dimensional image data. The ASIC 400 is also provided with a first register 460 for storing various numerical values used in processes performed by the first counter 430 and the first device control signal generating block 440. Specifically, the first register 460 stores a first reference value, a first pixel value, and various numerical values. The first reference value indicates the number of reference clock cycles for one pixel worth in the first image-reading unit 230. The first pixel value indicates the number of pixels in the main scanning direction of the first image-reading unit 230.

Similar to the first image-reading unit 230, the second image-reading unit 210 is a CIS device that includes light sources 211R, 211G, and 211B; and a light-receiving unit 213. The second image-reading unit 210 receives a clock signal CLK2 and a trigger signal TG2 inputted from the ASIC 400 and outputs read signals. For the second image-reading unit 210, the ASIC 400 also includes a second device control signal generating block 470, an image-processing circuit 480, and a second register 490. The second device control signal generating block 470 inputs the clock signal CLK2, trigger signal TG2, and other signals into the second image-reading unit 210 based on a count value inputted from the second counter 410. The image-processing circuit 480 processes read signals inputted from the second image-reading unit 210 to convert the image scanned from the document sheet into two-dimensional image data. The second register 490 stores various numerical values used in processes performed on the second counter 410 and the second device control signal generating block 470. The second register 490 stores a second reference value that indicates the number of reference clock cycles for one pixel in the second image-reading unit 210.

Figure 3:
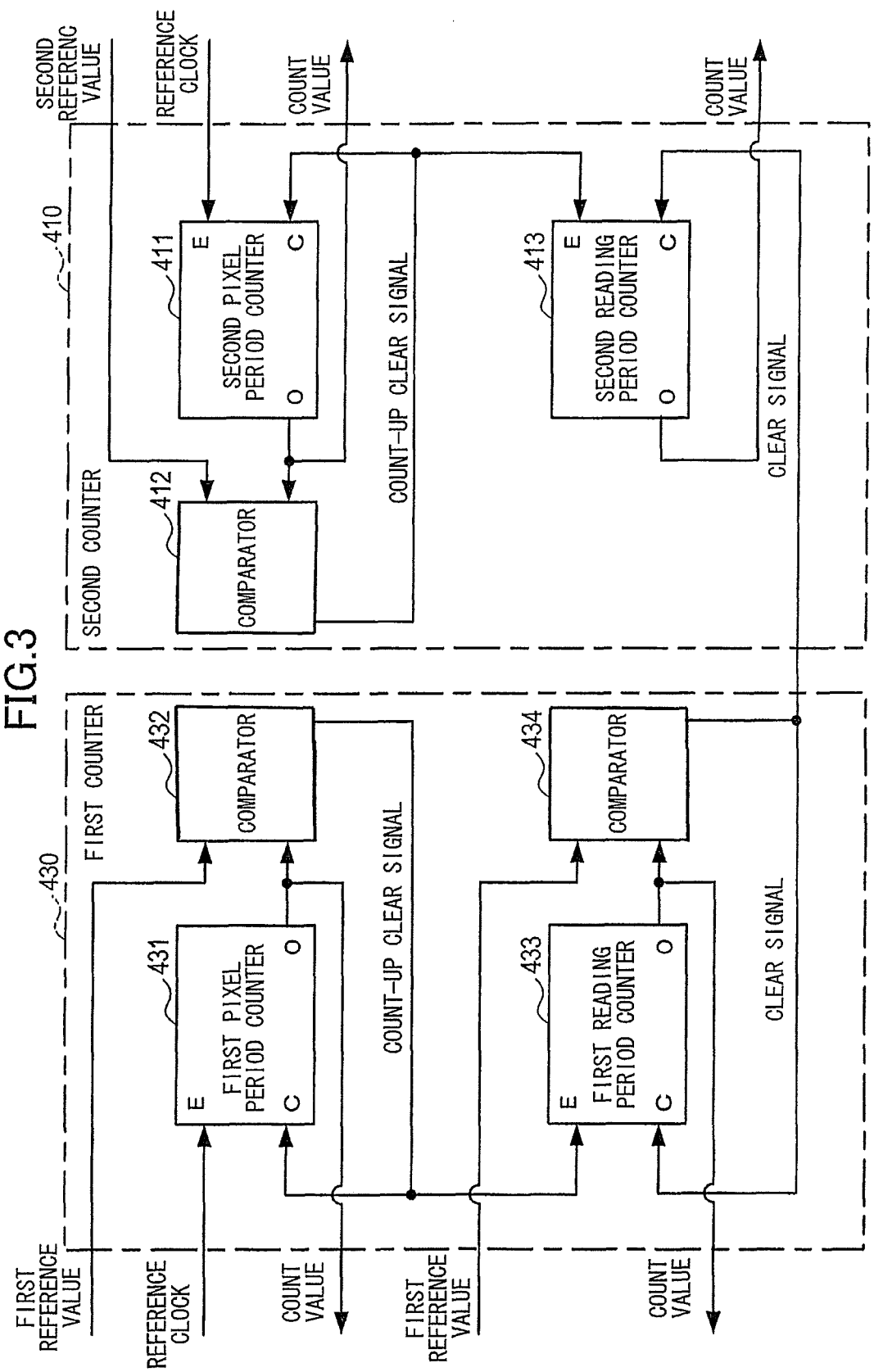
FIG. 3 is a block diagram illustrating a detailed structure of a counter in the control system.

As shown in FIG. 3, the first counter 430 includes a first pixel period counter 431, a comparator 432, a first reading period counter 433, and a comparator 434. The first pixel period counter 431 counts cycles of the reference clock. The comparator 432 receives a value from the first pixel period counter 431 equivalent to the count value of the reference clock.

The comparator 432 compares the count value inputted from the first pixel period counter 431 with the first reference value stored in the first register 460 and outputs a count-up clear signal when the two values match. The first pixel period counter 431 resets the count for reference clock cycles when a count-up clear signal is inputted.

The count-up clear signal is both inputted into the first pixel period counter 431 as a clear signal and inputted into the first reading period counter 433 as a count-up signal. The first reading period counter 433 inputs its count value into the comparator 434 similarly provided in the first counter 430. The comparator 434 compares the count inputted from the first reading period counter 433 to the first pixel value stored in the first register 460 and outputs a clear signal when the values match. This clear signal is inputted into both the first reading period counter 433 and a second reading period counter 413 described later.

The second counter 410 is provided with a second pixel period counter 411, a comparator 412, and a second reading period counter 413. The second pixel period counter 411 counts cycles of the reference clock. The comparator 412 receives a value equivalent to the reference clock count from the second pixel period counter 411. The comparator 412 compares the count inputted from the second pixel period counter 411 to the second reference value stored in the second register 490 and outputs a count-up clear signal when the two values match.

The first reference value stored in the first register 460 (22, for example) differs from the second preference value stored in the second register (40, for example). Further, the first pixel value (4545, for example) differs from the number of pixels in the main scanning direction of the second image-reading unit 210 (2500, for example, hereinafter referred to as the second pixel value).

The difference in the first reference value and the second reference value, and the difference in the first pixel value and the second pixel value are due to difference in performance of the first image-reading unit 230 and the second image-reading unit 210. The count-up clear signal outputted by the comparator 412 is both inputted into the second pixel period counter 411 as a clear signal and inputted into the second reading period counter 413 as a count-up signal. The second reading period counter 413 is cleared (hereinafter referred to as "reset") by the clear signal outputted from the comparator 434 of the first counter 430 described above.

Operations of the Control System for the Image-Reading Units

With the structure of the control system described above, the count value of the first pixel period counter 431 increases once for each cycle of the reference clock. Further, the count value of the first reading period counter 433 increases each time the count value of the reference clock reaches one pixel worth for the first image-reading unit 230 (that is, each time the comparator 432 outputs a count-up clear signal). Hence, the first device control signal generating block 440 outputs the clock signal CLK1 based on the count value of the first pixel period counter 431 and outputs the trigger signal TG1 and a periodic signal based on the count value of the first reading period counter 433. The first device control signal generating block 440 outputs the trigger signal TG1 each time the count value reaches the number of pixels in the main scanning direction of the first image-reading unit 230 (4545, for example), i.e., each time the count value is reset to zero.

Similarly, the count value of the second pixel period counter 411 increases for each cycle of the reference clock. Further, the count value of the second reading period counter 413 increases each time the count value for the reference clock reaches one pixel worth for the second image-reading unit 210 (that is, each time the comparator 412 outputs a count-up clear signal). Hence, the second device control signal generating block 470 outputs the clock signal CLK2 based on the count value of the second pixel period counter 411 and outputs the trigger signal TG2 and the periodic signal based on the count value of the second reading period counter 413. When the count value of the first reading period counter 433 reaches the number of pixels in the main scanning direction of the first image-reading unit 230, the first reading period counter 433 and the second reading period counter 413 are simultaneously reset by the clear signal. The second device control signal generating block 470 outputs the trigger signal TG2 each time the count value of the second reading period counter 413 is reset to zero.

In the conventional process, the trigger signal TG1 is outputted based on the number of cycles of the reference clock required for outputting read signals for one line in the first image-reading unit 230 (22×4545, for example), and the trigger signal TG2 is outputted based on the number of cycles of the reference clock required for outputting read signals for one line in the second image-reading unit 210 (40×2500, for example). Consequently, a difference is produced between the interval in which the trigger signal TG1 is outputted and the interval in which the trigger signal TG2 is outputted, producing offset in the subscanning direction between the reading positions of the second image-reading unit 210 and the first image-reading unit 230.

However, since the trigger signals TG1 and TG2 are outputted at timings when the respective count values of the first reading period counter 433 and the second reading period counter 413 are reset to zero, the interval in which the trigger signal TG1 is outputted matches the interval in which the trigger signal TG2 is outputted.

Hence, the image-reader 10 can read images from an original while suppressing the generation of offset in the subscanning direction between reading positions of the second image-reading unit 210 and the first image-reading unit 230.

The number of cycles of the reference clock required for outputting read signals for one color line in the first image-reading unit 230 (22×4545, for example) is smaller than the number of cycles of the reference clock required for outputting read signals for one color line in the second image-reading unit 210 (40×2500, for example).

Hence, the count value of the second counter 410 can be reset based on the first counter 430 through simple control. The difference between the number of clock pulses in this case is 10 (40×2500−22×4545=100,000−99,990=10). Therefore, when the clear signal is outputted after the first image-reading unit 230 has completed outputting one line worth of read signals, output of read signals from the second image-reading unit 210 for the effective reading area of one line is complete and only data for pixels in a dummy area is outputted from the second image-reading unit 210. The dummy area is generally provided in a CIS device, as disclosed in paragraph 0018 of Japanese patent application publication No. H10-285333, for example, and a description of this dummy area has been omitted here. Moreover, the first image-reading unit 230 does not merely read document sheets conveyed along the conveying path, but is also configured to read a document sheet placed on the document support base 21 while moving below the document support base 21 in response to rotations of the motor 351. Accordingly, since the first image-reading unit 230 has a higher frequency of usage than the second image-reading unit 210, the second counter 410 is reset based on the first counter 430 used for controlling the first image-reading unit 230 as described above in the embodiment, achieving smoother control.

Variations of the Embodiment

While the invention has been described in detail with reference to specific embodiments thereof, it would be apparent to those skilled in the art that many modifications and variations may be made therein without departing from the spirit of the invention.

For example, the clear signal inputted into the second reading period counter 413 may also be inputted into the second pixel period counter 411. In other words, only count values outputted from the first counter 430 and the second counter 410 that correspond to the number of pixels in the second image-reading unit 210 and the first image-reading unit 230 (i.e., only some count values) are simultaneously reset in the embodiment, but all count values outputted by the first counter 430 and the second counter 410 may be reset simultaneously. This configuration can be implemented by inputting the logical OR of the clear signal outputted from the comparator 434 and the count-up clear signal outputted from the comparator 412 into the second pixel period counter 411 as a clear signal.

Further, there is the possibility of a malfunction occurring in the second reading period counter 413 when the timing at which the comparator 412 inputs the count-up clear signal into the second reading period counter 413 differs from the timing at which the comparator 434 inputs the clear signal into the second reading period counter 413. Therefore, a clear signal determination circuit 414 described next may be provided in the second counter 410.

Figure 4:
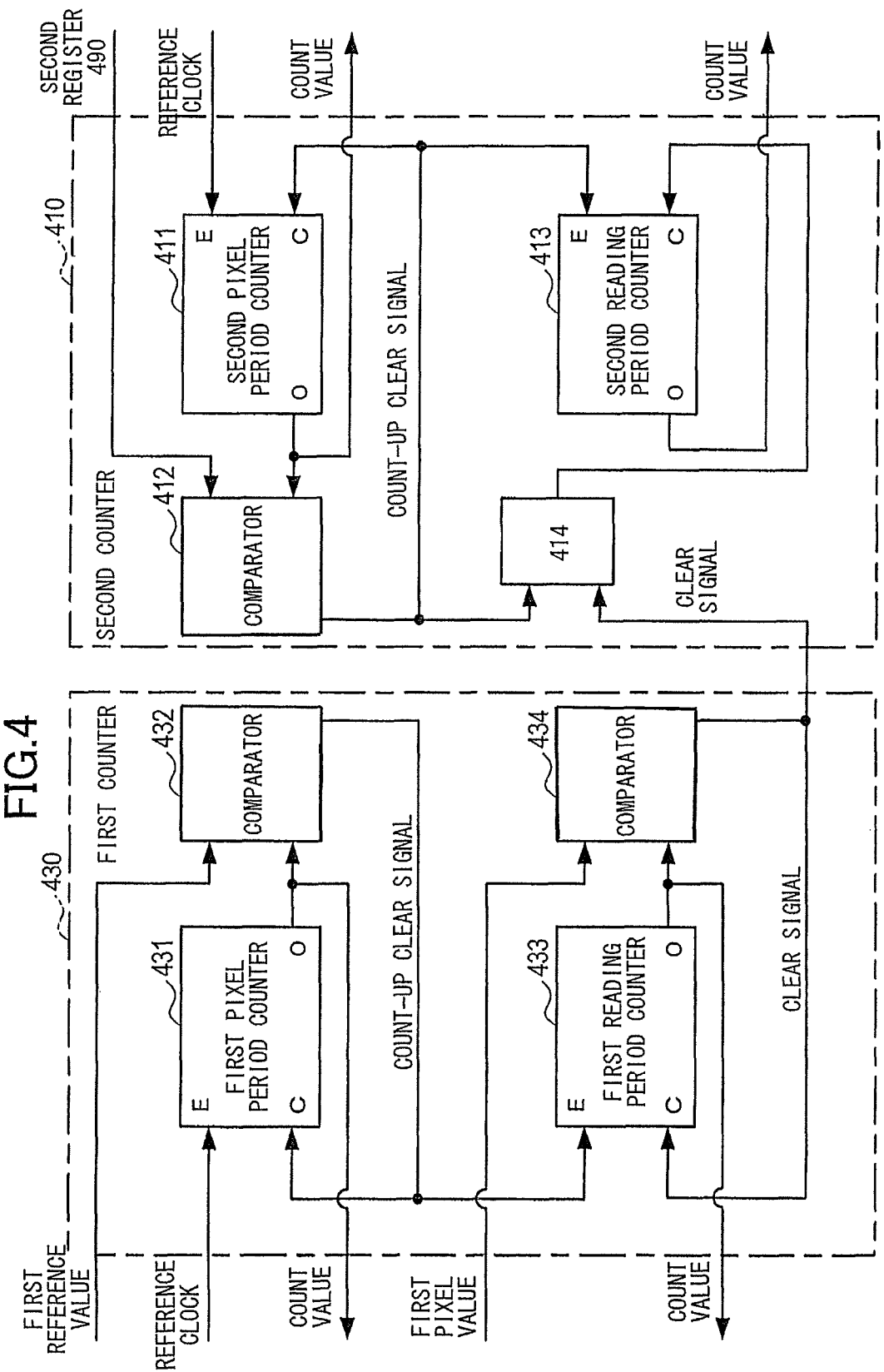
FIG. 4 is a block diagram illustrating a detailed structure of a counter according to a variation of the invention.

As shown in FIG. 4, the count-up clear signal from the comparator 412 and the clear signal from the comparator 434 are inputted into the clear signal determination circuit 414 provided in the second counter 410. A clear signal is inputted into the second reading period counter 413 at a timing after the clear signal from the comparator 434 is inputted into the clear signal determination circuit 414 and subsequently the count-up clear signal from the comparator 412 is inputted into the clear signal determination circuit 414.

Figure 5:
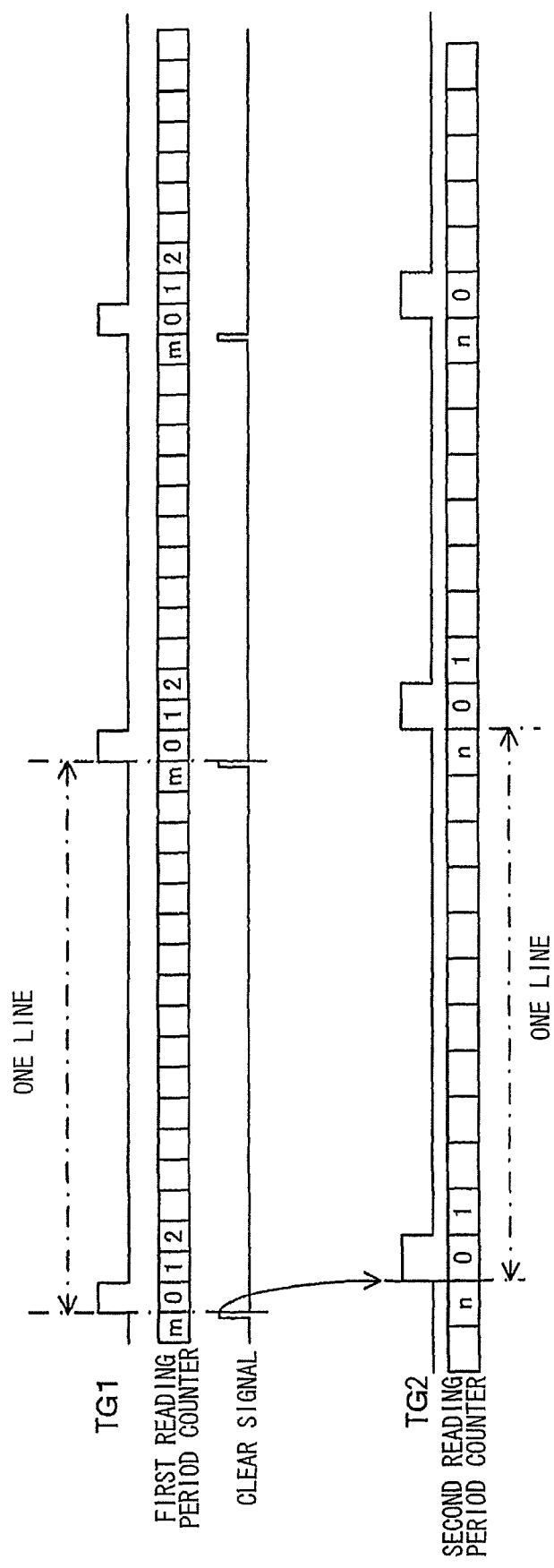
FIG. 5 is a timing chart illustrating an operation of the counter shown in FIG. 4.

As shown in FIG. 5, the clear signal is outputted from the comparator 434 when the count value of the first reading period counter 433 reaches the number of pixels in the main scanning direction of the first image-reading unit 230 (the natural number m in FIG. 5), after which the count-up clear signal is outputted from the comparator 412, incrementing the count value of the second reading period counter 413. Subsequently, the second reading period counter 413 is reset. Hence, this configuration can suitably suppress malfunctions of the second reading period counter 413.

Further, the first reading period counter 433 and the second reading period counter 413 are simultaneously reset each time the first image-reading unit 230 outputs one line worth of read signals for one of the colors R, G, or B. Therefore, the frequency at which the first reading period counter 433 and the second reading period counter 413 are simultaneously reset is increased, enabling the image-reader 10 to read images from a document sheet while better suppressing offset in the subscanning direction between reading positions of the second image-reading unit 210 and the first image-reading unit 230.

As shown in FIG. 5, the clear signal is outputted from the comparator 434 when the count value of the first reading period counter 433 reaches the first pixel value (the natural number m in FIG. 5), after which the count-up clear signal is outputted from the comparator 412, incrementing the count value of the second reading period counter 413. Subsequently, the second reading period counter 413 is reset. Further, the second device control signal generating block 470 outputs the trigger signal TG2 each time the second reading period counter 413 is reset. Accordingly, the image-reader 10 can more reliably suppress offset in the subscanning direction between the reading positions of the second image-reading unit 210 and the first image-reading unit 230, while reliably suppressing malfunctions of the second reading period counter 413.

In the embodiment described above, the first reading period counter 433 and the second reading period counter 413 are reset simultaneously each time the first image-reading unit 230 outputs one line worth of read signals for one of the colors R, G, or B. However, the first reading period counter 433 and the second reading period counter 413 may be reset simultaneously each time the first image-reading unit 230 outputs read signals for all three colors R, G, and B.

The second image-reading unit 210 and the first image-reading unit 230 in the embodiment are both configured of CIS devices that sequentially output read signals for each of the colors R, G, and B in one line units with respect to the main scanning direction, and subsequently combine the three line components and output one color line worth of read signals. However, one or both of the second image-reading unit 210 and the first image-reading unit 230 may be configured of a CCD device that simultaneously reads a plurality of colors in units of one line in the main scanning direction.

Figure 6:
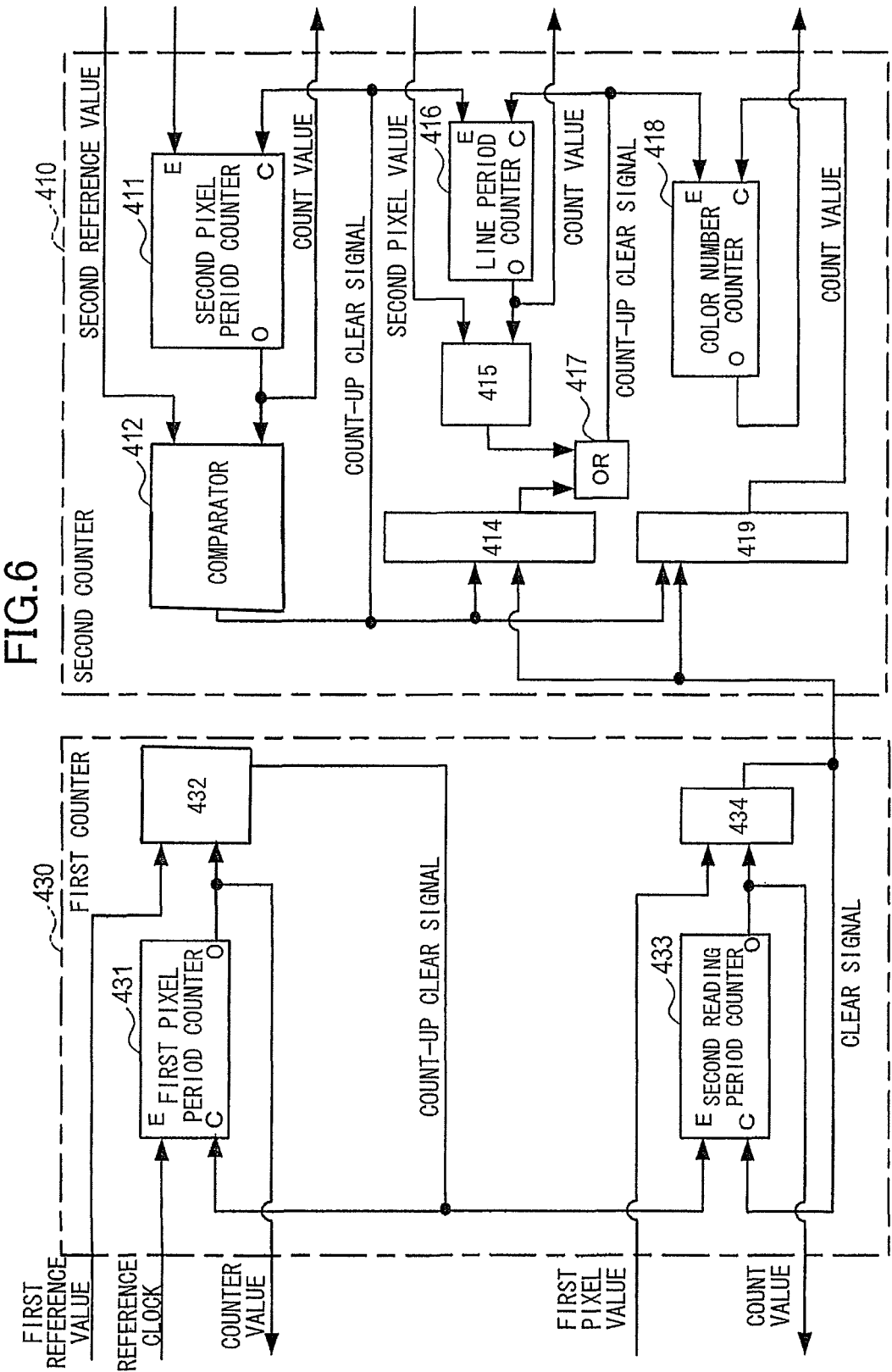
FIG. 6 is a block diagram illustrating a detailed structure of a counter according to another variation of the invention.

FIG. 6 is a block diagram showing a detailed structure of the first counter 430 and the second counter 410 when the second image-reading unit 210 is configured of a CIS device, as described in the embodiment, while the first image-reading unit 230 is configured of a CCD device. As shown in FIG. 6, in place of the second reading period counter 413 described in the embodiment, the second counter 410 is provided with a comparator 415, a line period counter 416, an OR circuit 417, a color number counter 418, and a clear signal determination circuit 419. Each count value of the color number counter 418 corresponds to one of the light sources 211R, 211G, and 211B that currently irradiates light. For example, the count values "0", "1", and "2" respectively correspond to the light sources 211R, 211G, and 211B. The CCD device reads the image in line basis. Specifically, in the CCD device, the color image data for one line is obtained by one scanning. On the other hand, for obtaining color image data for one line, the CIS device scans one line the plurality of times (three times in the embodiment) while changing the color of light (one of R, G, and B colors) to emit to the original document. The color number counter 418 specifies the color currently emitting to the original document.

The count-up clear signal outputted from the comparator 412 is inputted into the line period counter 416 as a count-up signal, and the count value of the line period counter 416 is inputted into the comparator 415. The comparator 415 compares the count value inputted from the line period counter 416 with the value stored in the second register 490 for the number of pixels in the main scanning direction of the second image-reading unit 210 (1675, for example) and outputs a signal to the OR circuit 417 when the two values match. The OR circuit 417 outputs the logical OR of the signal received from the clear signal determination circuit 414 and the signal received from the comparator 415 as a count-up clear signal.

This count-up clear signal is both inputted into the line period counter 416 as a clear signal and inputted into the color number counter 418 as a count-up signal. Further, the clear signal determination circuit 419 inputs a clear signal into the color number counter 418 at the same time the clear signal determination circuit 414 outputs a signal.

In this variation, the first reference value (40, for example) stored in the first register 460 indicates the number of reference clock cycles for one pixel worth of the CCD device. The first pixel value stored in the register 460 indicates the number of pixels for the CCD device in the main scanning direction (2500, for example). Further, the second register 490 stores the second reference value that indicates the number of pixels in the main scanning direction of the second image-reading unit 210 (1516, for example) in addition to the second reference value (22, for example). In the first counter 430, the first register 460 inputs the first reference value into the comparator 432, and also inputs the first pixel value in the comparator 434. Similarly, the second reference value is inputted into the comparator 412 of the second counter 410, while the second pixel value is inputted into the comparator 415.

Figure 7:
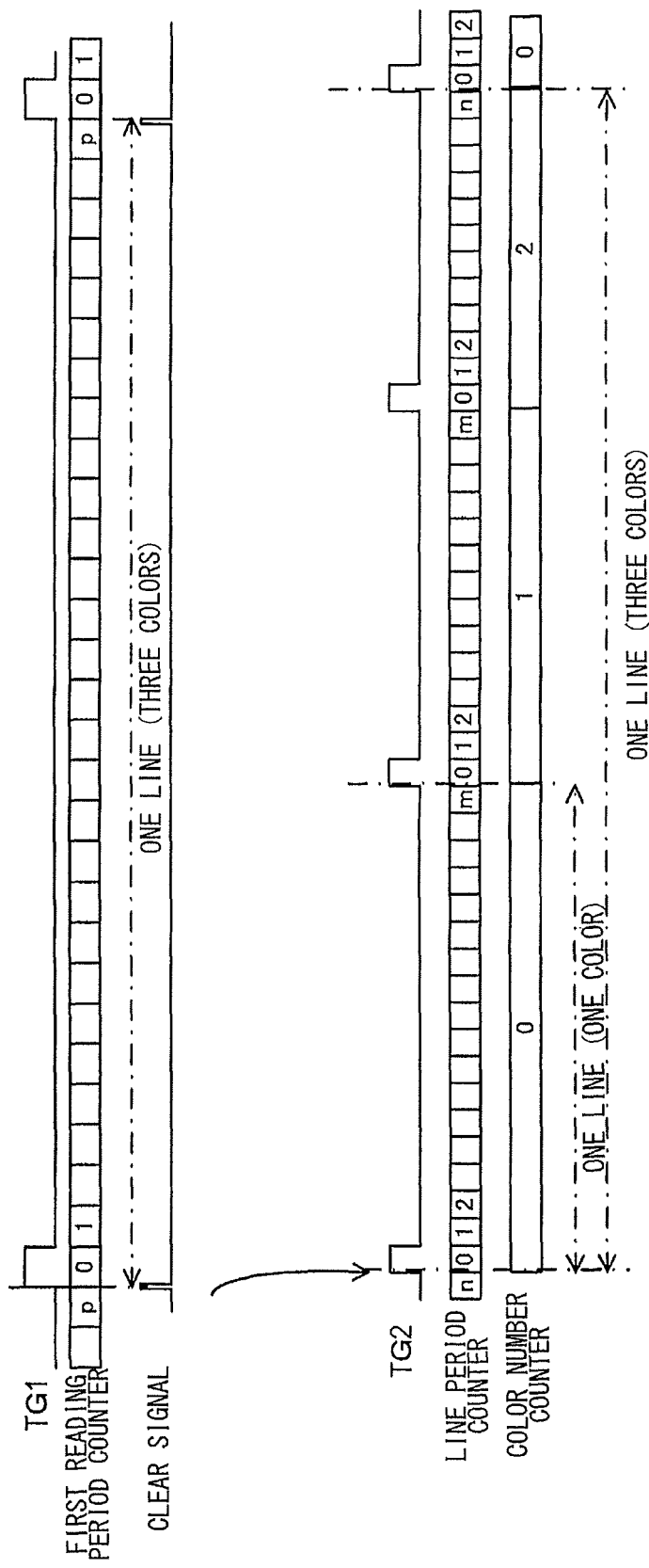
FIG. 7 is a timing chart illustrating an operation of the counter shown in FIG. 6.

In this case, as illustrated in FIG. 7, the comparator 412 outputs a count-up clear signal when the count value of the first reading period counter 433 reaches the same value as the first pixel value. Subsequently, the first reading period counter 433, the line period counter 416, and the color number counter 418 are reset simultaneously.

The first device control signal generating block 440 outputs the trigger signal TG1 each time the count value of the first reading period counter 433 is reset to zero. Further, the second device control signal generating block 470 outputs the trigger signal TG2 each time the count value of the line period counter 416 is reset to zero.

With this configuration, the interval during which the trigger signal TG1 is outputted for one color line of the first image-reading unit 230 is equivalent to the interval in which the trigger signal TG2 is outputted for one color line worth of the three components R, G, and B.

Therefore, as in the embodiment described in FIG. 5, the image-reader 10 according to this variation of the embodiment can read images from a document sheet while suppressing malfunctions of the line period counter 416 and the color number counter 418 and suppressing offset in the subscanning direction between reading positions of the second image-reading unit 210 and the first image-reading unit 230.

Here, the second device control signal generating block 470 outputs a periodic signal to the image-processing circuit 480 based on the count values received from the line period counter 416 and the color number counter 418.

Further, the number of reference clock cycles (40×2500, for example) required for the first image-reading unit 230 to output one line worth (here, in the CCD device, one line worth of data includes R, G, B data) of read signals is smaller than the number of reference clock cycles (22×1516×3, for example) required for the second image-reading unit 210 to output read signals for all three colors of a line. Accordingly, resetting the count value of the second counter 410 based on the first counter 430 can be achieved through simple control. Further, the difference between the numbers of reference clock cycles is 56. Hence, when the clear signal is outputted after the first image-reading unit 230 has completed outputting read signals for one line worth, the second image-reading unit 210 has already completed outputting read signals for one color line worth and is merely outputting data for pixels in a dummy area.

Further, a color number counter similar to that provided in the second counter 410 in FIG. 6 may also be provided in the bottom sections of the first counter 430 and the second counter 410 shown in FIG. 3 or 4. Further, one or both of the second image-reading unit 210 and the first image-reading unit 230 may be configured of a monochrome CIS device. For example, if the first image-reading unit 230 is configured of a monochrome CIS device, while the second image-reading unit 210 is configured of a color CIS device, the first counter 430 and the second counter 410 having the structure shown in FIG. 6 may be employed.

What is claimed is:

1. An image-reader comprising:
 a first counter that is configured to count a first count value based on a first clock;
 a second counter that is configured to count a second count value based on a second clock;
 a first reading unit that is configured to read a first surface of a document sheet based on the first count value; and
 a second reading unit that is configured to read a second surface of the document sheet based on the second count value, the second surface being opposite surface of the first surface,
 wherein when the first count value reaches a prescribed first value, both the first counter value and the second count value are reset, wherein the first counter includes:
 a first pixel period counter that is configured to count a first pixel period count value based on the first clock, the first pixel period count value being reset when the first pixel period count value reaches a prescribed first reference value indicating number of cycles of the first clock corresponding to one pixel of the first reading unit; and
 a first reading period counter that is configured to count a first reading period count value indicating number of resets of the first pixel period count value;
 wherein the second counter includes:
 a second pixel period counter that is configured to count a second pixel period count value based on the second clock, wherein the second pixel period count value is reset when the second pixel period count value reaches a prescribed second reference value indicating number of cycles of the second clock corresponding to one pixel of the second reading unit; and
 a second reading period counter that is configured to count a second reading period count value indicating number of resets of the second pixel period count value,
 wherein when the first reading period count value reaches a prescribed first line pixel value corresponding to number of pixels in one line of the first reading unit, both the first pixel reading period count value and the second pixel reading period count value are reset.

2. The image-reader according to claim 1, wherein the second pixel reading period count value is reset when the second pixel period count value reaches the prescribed second reference value and after the first reading period count value has reached the prescribed first line pixel value.

3. The image-reader according to claim 1, further comprising:
 a main casing having a document support base on which the document sheet is placed, the main casing including the first reading unit; and
 a document cover that is configured to cover the document on the document support base, the document cover including the second reading unit.

4. The image-reader according to claim 1, wherein the first clock coincides with the second clock.

5. An image-reader comprising:
 a first counter that is configured to count a first count value based on a first clock;
 a second counter that is configured to count a second count value based on a second a first reading unit that is configured to read a first surface of a document sheet based on the first count value; and
 a second reading unit that is configured to read a second surface of the document sheet based on the second count value, the second surface being opposite surface of the first surface,
 wherein when the first count value reaches a prescribed first value, both the first counter value and the second count value are reset,
 wherein the first reading unit reads the first surface in a line basis,
 wherein the first counter includes:
 a first pixel period counter that is configured to count a first pixel period count value based on the first clock, the first pixel period count value being reset when the first pixel period count value reaches a first reference value indicating number of cycles of the reference clock corresponding to one pixel of the first reading unit; and
 a first reading period counter that is configured to count a first reading period count value indicating number of resets of the first pixel period count value, wherein the first pixel reading period count value is reset when the first reading period count value reaches a prescribed first line pixel value corresponding to number of pixels in one line of the first reading unit,
 wherein the second reading unit changes a color of light irradiated to the document sheet among a plurality of colors, the second reading unit reading the second surface in a line basis for each colors of light,
 wherein the second counter includes:
 a second pixel period counter that is configured to count a second pixel period count value based on the second clock, wherein the second pixel period count value is reset when the second pixel period count value reaches a prescribed second reference value indicating number of cycles of the second clock corresponding to one pixel of the second reading unit;
 a line period counter that is configured to count a line period count value indicating number of resets of the second pixel period count value, wherein the line period count value is reset when the line period count value reaches a prescribed second line pixel value corresponding to number of pixels in one line of the second reading unit for one color; and
 a color number counter that counts a color number count value indicating number of resets of the line period count value, wherein when the first reading period count value reaches the prescribed first line pixel value, both the line period count value and the color number count value are reset.

6. The image-reader according to claim 5, wherein both the line period count value and the color number count value are reset when the second pixel period count value reaches the prescribed second reference value and after the first reading period count value has reached the prescribed first line pixel value.

7. The image-reader according to claim 5, wherein a value obtained by multiplying the prescribed first reference value by the prescribed first line pixel value is smaller than a value obtained by multiplying the prescribed second reference value by the prescribed second line pixel value and number of the plurality of colors.

8. The image-reader according to claim 5, wherein the first reading unit includes a CCD unit that reads the first surface of the document sheet in the line basis, wherein the second reading unit includes a CIS device that changes a color of light irradiated to the document sheet among the plurality of colors and reads the second surface of the document sheet in the line basis for each colors of light.

9. The image-reader according to claim 5, further comprising:
   a main casing having a document support base on which the document sheet is placed, the main casing including the first reading unit; and
   a document cover that is configured to cover the document on the document support base, the document cover including the second reading unit.

10. The image-reader according to claim 5, wherein the first clock coincides with the second clock.

* * * * *